(12) United States Patent
Ohki et al.

(10) Patent No.: US 7,744,283 B2
(45) Date of Patent: Jun. 29, 2010

(54) BEARING FOR ALTERNATOR AND BEARING FOR PULLEY

(75) Inventors: Chikara Ohki, Kuwana (JP); Tomoaki Goto, Iwata (JP)

(73) Assignee: NTN Corporation, Osaka (JP)

( * ) Notice: Subject to any disclaimer, the term of this patent is extended or adjusted under 35 U.S.C. 154(b) by 753 days.

(21) Appl. No.: 10/795,389

(22) Filed: Mar. 9, 2004

(65) Prior Publication Data

US 2004/0179761 A1  Sep. 16, 2004

(30) Foreign Application Priority Data

Mar. 14, 2003 (JP) ............... 2003-070508
Jan. 21, 2004 (JP) ............... 2004-013413

(51) Int. Cl.
*F16C 33/30* (2006.01)

(52) U.S. Cl. .................. 384/492; 384/912; 148/906

(58) Field of Classification Search ............. 384/492, 384/907, 912, 913; 148/320, 906
See application file for complete search history.

(56) References Cited

U.S. PATENT DOCUMENTS

| | | | |
|---|---|---|---|
| 3,954,517 A | 5/1976 | Jatczak et al. | |
| 4,162,419 A * | 7/1979 | DeAngelis | ............... 310/266 |
| 4,930,909 A | 6/1990 | Murakami et al. | |
| 4,971,634 A | 11/1990 | Shibata et al. | |
| 5,085,733 A | 2/1992 | Mitamura | |
| 5,129,966 A | 7/1992 | Rao | |
| 5,137,375 A | 8/1992 | Murakami et al. | |
| 5,180,450 A | 1/1993 | Rao | |
| 5,338,377 A | 8/1994 | Mitamura et al. | |
| 5,352,203 A | 10/1994 | Murakami et al. | |
| 5,352,303 A | 10/1994 | Murakami et al. | |
| 5,375,323 A | 12/1994 | Sata | |
| 5,413,643 A | 5/1995 | Murakami et al. | |
| 5,427,457 A | 6/1995 | Furumura et al. | |
| 5,427,600 A | 6/1995 | Itoh et al. | |
| 5,456,136 A | 10/1995 | Yamashita et al. | |
| 5,456,766 A | 10/1995 | Beswick et al. | |
| 5,595,610 A | 1/1997 | Maeda et al. | |
| 5,611,250 A | 3/1997 | Narai et al. | |

(Continued)

FOREIGN PATENT DOCUMENTS

CN          1344932 A          4/2002

(Continued)

OTHER PUBLICATIONS

English translation of Japanese Reference 5-118336, Notoya, Published May 1993.*

(Continued)

*Primary Examiner*—William C Joyce
(74) *Attorney, Agent, or Firm*—McDermott Will & Emery LLP

(57) ABSTRACT

A bearing for alternators and a bearing for pulleys for reducing hydrogen embrittlement or cracking is used when the bearing is in an environment having a severe condition, such as, when hydrogen is generated from grease or the like. The bearing includes a rolling element, an inner ring and an outer ring, and at least one of the rolling element, where the inner and outer rings have a nitrogen enriched layer containing austenite crystal grains having a grain size number exceeding 10.

2 Claims, 11 Drawing Sheets

U.S. PATENT DOCUMENTS

| | | | |
|---|---|---|---|
| 5,658,082 | A | 8/1997 | Tsushima et al. |
| 5,733,667 | A | 3/1998 | Nakasuji et al. |
| 5,772,956 | A | 6/1998 | Hasegawa et al. |
| 5,775,280 | A | 7/1998 | Schmidt et al. |
| 5,792,286 | A | 8/1998 | Inoue et al. |
| 5,803,993 | A | 9/1998 | Yoshida et al. |
| 5,848,846 | A | 12/1998 | Sugiyama et al. |
| 5,853,249 | A | 12/1998 | Maeda et al. |
| 5,944,916 | A | 8/1999 | Chung |
| 5,972,130 | A | 10/1999 | Underys et al. |
| 5,979,383 | A | 11/1999 | Faville et al. |
| 6,012,851 | A | 1/2000 | Hirakawa et al. |
| 6,086,686 | A | 7/2000 | Tanaka et al. |
| 6,095,692 | A | 8/2000 | Takemura |
| 6,149,734 | A | 11/2000 | Isogai et al. |
| 6,158,263 | A | 12/2000 | Maeda et al. |
| 6,165,289 | A | 12/2000 | Matsumoto et al. |
| 6,224,688 | B1 * | 5/2001 | Takemura et al. ............ 148/318 |
| 6,251,198 | B1 | 6/2001 | Koo et al. |
| 6,258,179 | B1 | 7/2001 | Takayama et al. |
| 6,290,398 | B1 | 9/2001 | Fujiwara et al. |
| 6,306,227 | B2 | 10/2001 | Okayama et al. |
| 6,309,475 | B1 | 10/2001 | Takayama et al. |
| 6,328,009 | B1 | 12/2001 | Brothers |
| 6,342,109 | B1 | 1/2002 | Takemura et al. |
| 6,423,158 | B1 | 7/2002 | Maeda et al. |
| 6,440,232 | B1 | 8/2002 | Takemura et al. |
| 6,447,619 | B1 | 9/2002 | Takayama et al. |
| 6,488,789 | B2 * | 12/2002 | Tajima et al. ............... 148/333 |
| 6,532,920 | B1 | 3/2003 | Sweetnam et al. |
| 6,582,532 | B1 | 6/2003 | Kurebayashi et al. |
| 6,602,358 | B1 | 8/2003 | Ochi et al. |
| 6,641,680 | B2 | 11/2003 | Nishimori et al. |
| 6,699,335 | B2 | 3/2004 | Murakami et al. |
| 6,855,217 | B2 | 2/2005 | Suzuki |
| 7,147,382 | B2 | 12/2006 | Suzuki et al. |
| 2002/0043111 | A1 | 4/2002 | Takagi et al. |
| 2002/0082133 | A1 | 6/2002 | Yoshikawa et al. |
| 2002/0088511 | A1 | 7/2002 | Nakamura et al. |
| 2002/0159905 | A1 | 10/2002 | Bachmann et al. |
| 2003/0037635 | A1 | 2/2003 | Tsuchiyama et al. |
| 2003/0040401 | A1 | 2/2003 | Okita et al. |
| 2003/0063829 | A1 | 4/2003 | Tamada et al. |
| 2003/0075244 | A1 | 4/2003 | Kurebayashi et al. |
| 2003/0123769 | A1 | 7/2003 | Ohki |
| 2004/0079310 | A1 | 4/2004 | Suzuki et al. |
| 2004/0170348 | A1 | 9/2004 | Okugami et al. |
| 2004/0179761 | A1 | 9/2004 | Ohki et al. |
| 2004/0228561 | A1 | 11/2004 | Okugami et al. |
| 2005/0045247 | A1 | 3/2005 | Ohki |
| 2005/0109308 | A1 | 5/2005 | Suzuki et al. |
| 2005/0205163 | A1 | 9/2005 | Ohki |
| 2007/0034301 | A1 | 2/2007 | Hasegawa et al. |
| 2007/0151633 | A1 | 7/2007 | Ohki et al. |
| 2007/0169850 | A1 | 7/2007 | Ohki et al. |

FOREIGN PATENT DOCUMENTS

| | | |
|---|---|---|
| CN | 1351694 | 5/2002 |
| CN | 1421541 | 6/2003 |
| DE | 4 204 982 A1 | 8/1993 |
| DE | 199 60 803 A1 | 6/2000 |
| DE | 102 54 635 A1 | 6/2003 |
| EP | 0 458 646 | 11/1991 |
| EP | 0 600 421 | 6/1994 |
| EP | 0 626 468 A1 | 11/1994 |
| EP | 0 723 034 A2 | 7/1996 |
| EP | 0 811 789 A1 | 12/1997 |
| EP | 0 950 723 A1 | 10/1999 |
| EP | 1 070 760 A2 | 1/2001 |
| EP | 1 158 064 A1 | 11/2001 |
| EP | 1 273 672 A1 | 1/2003 |
| EP | 1 411 142 A1 | 4/2004 |
| FR | 2 841 907 | 1/2004 |
| GB | 2 258 274 A | 2/1993 |
| JP | 48-028308 | 4/1973 |
| JP | 63-185917 | 11/1988 |
| JP | 02-125841 A | 5/1990 |
| JP | 2-190615 | 7/1990 |
| JP | 03-116706 | 12/1991 |
| JP | 04-254574 | 9/1992 |
| JP | 05-009584 | 1/1993 |
| JP | 5-118336 | * 5/1993 |
| JP | 05-163563 A | 6/1993 |
| JP | 05-179350 | 7/1993 |
| JP | 5-263091 | 10/1993 |
| JP | 6-101424 | 4/1994 |
| JP | 06-117438 | 4/1994 |
| JP | 06-247253 | 9/1994 |
| JP | 06-286577 | 10/1994 |
| JP | 06-341441 | 12/1994 |
| JP | 07-027139 | 1/1995 |
| JP | 08-004774 | 1/1996 |
| JP | 08-049057 | 2/1996 |
| JP | 08-233070 | 9/1996 |
| JP | 08-311603 | 11/1996 |
| JP | 09-053148 | 2/1997 |
| JP | 09-176740 | 7/1997 |
| JP | 09-316601 | 12/1997 |
| JP | 09-329139 | 12/1997 |
| JP | 10-030150 | 2/1998 |
| JP | 10-047334 | 2/1998 |
| JP | 10-068419 | 3/1998 |
| JP | 10-103339 | 4/1998 |
| JP | 10-110720 | 4/1998 |
| JP | 10-168515 | 6/1998 |
| JP | 10-184701 | 7/1998 |
| JP | 10-204612 | 8/1998 |
| JP | 10-231908 | 9/1998 |
| JP | 11-080897 | 3/1999 |
| JP | 11-101247 | 4/1999 |
| JP | 11-140543 | 5/1999 |
| JP | 11-222627 A | 8/1999 |
| JP | 11-303874 | 11/1999 |
| JP | 2000-018255 A | 1/2000 |
| JP | 2000-038906 | 2/2000 |
| JP | 2000-038907 | 2/2000 |
| JP | 2000-54810 | 2/2000 |
| JP | 2000-129347 | 5/2000 |
| JP | 2000-205284 | 7/2000 |
| JP | 2000-212721 | 8/2000 |
| JP | 2001-123244 | 5/2001 |
| JP | 2001-200314 | 7/2001 |
| JP | 2002-031212 | 1/2002 |
| JP | 2002-070872 | 3/2002 |
| JP | 2002-120508 | 4/2002 |
| JP | 2002-180203 | 6/2002 |
| JP | 2002-194438 | 7/2002 |
| JP | 2002-256336 | 9/2002 |
| JP | 2002-339054 | 11/2002 |
| JP | 2003-56315 | 2/2003 |
| JP | 2003-083337 | 3/2003 |
| JP | 2003-083339 | 3/2003 |
| JP | 2003-156050 | 5/2003 |
| JP | 2003-226918 | 8/2003 |
| JP | 2003-226919 | 8/2003 |
| JP | 2003-287035 | 10/2003 |
| JP | 2003-294034 | 10/2003 |
| WO | WO 91/00929 | 1/1991 |

| | | |
|---|---|---|
| WO | WO 0240730 | 5/2002 |

OTHER PUBLICATIONS

Chinese Office Action issued in corresponding Chinese Patent Application No. CN 200410039931.9, dated May 11, 2007.
Japanese Office Action, with English translation, issued in Japanese Patent Application No. JP 2004-053995 dated on Jun. 17, 2008.
Chinese Office Action, with English translation, issued in Chinese Patent Application No. CN 200610004620.8, mailed Sep. 5, 2008.
"Technical Means for Improvement of Service Life of a Rolling Bearing", Bearing, 2001, pp. 1,2,5 and 45, No. 5, and partial translation.
Metallic Material Refining Technology, May 1995, p. 47, and partial translation.
Japanese Office Action, with English Translation, issued in Japanese Patent Application No. 2002-194775, dated on Mar. 22, 2006.
Japanese Office Action, with English Translation, issued in Japanese Patent Application No. 2002-194793, dated on Mar. 22, 2006.
Japanese Office Action, with English Translation, issued in Japanese Patent Application No. 2002-194804, dated on Mar. 20, 2007.
Japanese Office Action, with English Translation, issued in Japanese Patent Application No. 2002-194804, dated on Nov. 28, 2006.
Japanese Office Action, with English Translation, issued in Japanese Patent Application No. 2002-194921, dated on Nov. 28, 2006.
Japanese Office Action, with English Translation, issued in Japanese Patent Application No. 2002-303036, dated on Apr. 25, 2006.
Japanese Office Action, with English Translation Issued in Japanese Patent Application No. 2002-303036, dated on Oct. 24, 2006.
Japanese Office Action, with English Translation, issued in Japanese Patent Application No. 2003-209737, dated on Feb. 6, 2007.
Japanese Office Action, with English Translation, issued in Japanese Patent Application No. 2002-194804, dated on Mar. 20, 2007.
European Search Report, issued in European Patent Application No. 05703409.2-2424, dated on Apr. 4, 2007.
Chinese Office Action, with English Translation, issued in Chinese Patent Application No. 200410008248.9, dated on Apr. 27, 2007.
Annual book of ASTM Standards Section Three Metals Test Methods and Analytical Procedures, 2003, vol. 03.01, ASTM, International Standards Worldwide.
JIS G 0551 "Methods of austenite grain size determination for steel", Published by Japanese Standards Association, Feb. 20, 1998.
JIS Z 2242 "Method of impact test for metallic materials", Published by Japanese Standards Association, Dec. 21, 1998.
JIS Z 2202 "Test pieces for impact test for metallic materials" Published by Japanese Standards Association, Feb. 20, 1998.
Burrier, Jr., H., "Hardenability of Carbon and Low-Alloy Steels", 2002, ASM International.
Vander Voort, G., "Embrittlement of Steels", 2002 ASM International.
Kim, C., et al., "Influence of Subzero and Shot-Peening Treatments on Impact and Fatigue Fracture Properties of Case-Hardened Steels", J. Heat Treat., Jun. 1981, pp. 43-53, vol. 2 No. 1.
US Office Action, issued in U.S. Appl. No. 10/686,766, dated on Nov. 7, 2007.
US Office Action, issued in U.S. Appl. No. 10/787,221, dated on Oct. 26, 2007.
U.S. Appl. No. 10/585,646, filed on Jul. 7, 2006.
Chinese Office Action, with English Translation issued in Chinese patent Application No. CN 2007-10146997.1 dated on Dec. 26, 2008.
European Search Report issued in European Patent Application No. 04807374.6-1252 dated Dec. 18, 2008.
United States Office Action issued in U.S. Appl. No. US 10/585,646 dated on Jan. 16, 2009.
Chinese Office Action, with English translation, issued in Chinese Patent Application No. 200710146996.7, dated Feb. 6, 2009.
Japanese Notice of Grounds of Rejection, w/ English translation thereof, issued in Japanese Patent Application No. JP 2006-139254 dated May 26, 2009.
Japanese Notice of Grounds of Rejection, w/ English translation thereof, issued in Japanese Patent Application No. JP 2004-024096 dated Jan. 19, 2010.

* cited by examiner

BEARING FOR ALTERNATOR AND BEARING FOR PULLEY

BACKGROUND OF THE INVENTION

1. Field of the Invention

The present invention relates generally to bearings for alternators and bearings for pulleys, and particularly to such bearings less prone to flake-accompanied, hydrogen embrittlement or cracking in an ambient of hydrogen.

2. Description of the Background Art

In bearings used for alternators or pulleys there is often observed a unique fracture accompanied with flakes at its damage starting point. The flake is dissimilar to a white etching constituent (WEC) introduced by rolling fatigue, a so called butterfly introduced in the vicinity of a non-metal inclusion and the like. The present flake is characterized by failing to have directivity relative to a direction of rolling. A bearing having a damage accompanied with flakes at a starting point apparently shows an increased amount of hydrogen in the steel, and in the flake there is a crack, which extends along a grain boundary deep inside. As such, such a damage as described above has been considered to be attributed to hydrogen. Hereinafter, this flake-accompanied, unique fracture will be referred to as hydrogen embrittlement or cracking.

Hydrogen embrittlement or cracking is caused possibly because as the bearding rotates, a chemically active fresh metal surface is produced and its catalysis effect decomposes a lubricant and generates hydrogen, which enters into the steel. Accordingly, as an approach against hydrogen embrittlement or cracking, (a1) using a chemically less decomposable lubricant and (a2) blackening to minimize the exposure of fresh metal surface have been considered effective.

For item (a1), a bearing is proposed, as follows: alkyl-diphenylether oil and poly α olefin oil are blended at a ratio in weight of 20:80 to 80:20 to prepare a base oil, which is blended with 5-40% by weight of an aromatic diurea compound or an aromatic urea-urethane compound as a thickener, and furthermore a grease composite with a passivation oxidizer and organic sulfonate added thereto is enclosed in a roller bearing to provide a grease enclosed bearing for an alternator, as disclosed in Japanese Patent Laying-open No. 5-263091.

For item (2b), a grease enclosed bearing is proposed that has a raceway having a rolling contact surface covered with an oxide film of 0.1 to 2.5 µm in thickness, as disclosed in Japanese Patent Laying-open No. 2-190615.

The above proposals, as confirmed in the field of the art, provide effectively prolonged lives.

In recent years, however, bearings for alternators and those for pulleys are used in increasingly severe environments, and simply taking the above approach is no longer sufficient. There is a demand for an approach that can provide an increased life against hydrogen embrittlement or cracking.

SUMMARY OF THE INVENTION

The present invention contemplates a bearing for alternators and a bearing for pulleys capable of reducing hydrogen embrittlement or cracking despite that the bearing is used in an environment under such a severe condition that hydrogen is generated from grease or the like and the bearing experiences a load of a condition facilitating hydrogen embrittlement or cracking.

The present invention provides a bearing for an alternator that supports a rotor shaft having one end with a pulley attached thereto and having a belt engaged therearound to transmit a driving force to the pulley to allow the rotor shaft to rotate a rotor. The bearing includes a rolling element, an inner ring and an outer ring, and at least one of the rolling element and the inner and outer rings has a nitrogen enriched layer and contains austenite crystal grains having a grain size number exceeding 10. Here, the austenite grains refer to crystal grains of austenite which is phase-transformed during the heating process, and the traces of grains remain after the austenite is transformed into martensite through quenching cooling as described above.

At least one of the rolling element and inner and outer rings containing austenite grains reduced in size to have a grain size number exceeding 10 that is combined with a nitrogen enriched layer significantly effectively reduces hydrogen embrittlement or cracking. This is possibly attributed to the following reason: in a single crystal grain a certain crystal plane provides hydrogen embrittlement or cracking and the crack does not exactly extend to adjacent crystal grains. To crack adjacent crystal grains it is necessary to store additional energy to do so. Storing energy for example in a hydrogen atom at a specific portion requires a period of time. This should contribute to a reduced rate of hydrogen embrittlement or cracking.

The austenite grain size number may be determined by the usual method defined by JIS, or determined according to the intercept method for example with the average grain size corresponding to the above grain size number. A smaller austenite grain size is desirable and an austenite grain size number of 11 or greater is further desirable. Alternatively, the average grain size may be 6 µm or less. The austenite grain size number may be achieved in the nitrogen enriched layer. In general, however, the condition of the fineness of austenite is satisfied in the body of steel located inside the nitrogen enriched layer.

The above-described austenite crystal grain may be any austenite crystal grain having a grain boundary that can be observed after being subjected to a process manifesting a grain boundary such as an etching process for a metal phase sample of the member of interest. The austenite crystal grain is sometimes referred to as a prior austenite grain as described earlier when it has a grain boundary just heated and ready to be subjected to low-temperature quenching. For measurement of the grain size, the average of JIS-defined grain size numbers may be converted to obtain an average grain diameter, as has been described above, or the intercept method or the like may be used in which a straight line is placed on a metal phase structure in an arbitrary direction to obtain an average length between points at which the straight line meets grain boundaries and the average length may be multiplied by a correction coefficient to represent a two- or three-dimensional length between the points.

The nitrogen enriched layer may be formed by a carbonitriding process, as will be described hereinafter. The nitrogen enriched layer may or may not be enriched with carbon.

A fine austenite grain as described above is obtained by carbonitriding steel for a bearing component at a temperature higher than an A1 transformation temperature, then cooling the steel to a temperature of less than the A1 transformation temperature, and then reheating the steel to a range in temperature of no less than the A1 transformation temperature and less than an A3 transformation temperature and also lower than the temperature applied to the carbonitriding process, and quenching the steel. This thermal treatment is referred to as a low-temperature secondary quenching. This production method will be described more specifically in an embodiment.

In the same application the present invention provides still another bearing for an alternator with at least one of the rolling element and the inner and outer rings having a nitrogen enriched layer and providing a fracture stress value of no less than 2,650 MPa.

The present inventors have found that the above thermal treatment allows steel having a carbonitrided layer to provide a conventionally unachievable stress value of no less than 2,650 MPa. A rolling bearing of large strength can be obtained exhibiting excellent durability against a radial load and a moment load superimposed on each other when the bearing is applied for an alternator.

In the same application the present invention provides still another bearing for an alternator with at least one of the rolling element and the inner and outer rings having a nitrogen enriched layer and a hydrogen content of no more than 0.5 ppm.

The above described thermal treatment (the low-temperature secondary quenching) can provide a reduced ratio of hydrogen contained in a member of steel before it is used for the alternator. This can increase the period of time required for hydrogen entering the steel to reach a critical value at which the steel cracks, and together with other, still unclarified reason can render the steel less prone to hydrogen embrittlement or cracking.

Smaller amounts of hydrogen are desirable. However, reducing an amount of hydrogen to less than 0.3 ppm requires heating for a long period of time, and austenite grains would have a coarse and large diameter and toughness would rather be impaired. Accordingly, an amount of hydrogen falling within a range of 0.3 to 0.5 ppm is desirably contained. More desirably, an amount of hydrogen falling within a range of 0.35 to 0.45 ppm is contained.

In measuring the above hydrogen content, diffusible hydrogen is not measured and only the non-diffusible hydrogen released from the steel at a predetermined temperature or higher is measured. Diffusible hydrogen in a sample of small size is released from the sample to be scattered even at room temperature, and therefore the diffusible hydrogen is not measured. Non-diffusible hydrogen is trapped in any defect in the steel and only released from the sample at a predetermined heating temperature or higher. Even if only the non-diffusible hydrogen is measured, the hydrogen content considerably varies depending on the method of measurement. The above mentioned range of hydrogen content is determined by thermal conductimetry. In addition, as detailed later, the measurement may be taken by means of a LECO DH-103 hydrogen determinator or like measuring device.

In the present bearing for the alternator at least one of the rolling element and the inner and outer rings having the nitrogen enriched layer may have a surface layer containing globular carbide having an area ratio of no less than 10%.

The surface layer containing globular carbide having an area ratio of no less than 10% allows the bearing for the alternator to be furthermore resistant to hydrogen embrittlement or cracking.

The present invention provides a bearing for a pulley that is posed between a pulley having a belt engaged therearound and a rotative shaft passing through the pulley. The bearing includes a rolling element, an inner ring and an outer ring, and at least one of the rolling element and the inner and outer rings has a nitrogen enriched layer and contains austenite crystal grains having a grain size number exceeding 10.

Pulleys used in automobiles are increasingly miniaturized and subjected to large loads. As such, a rotary shaft increasingly tends to rotate rapidly, and the bearing is used in a condition in which hydrogen is generated for example from grease. A pulley with the above described bearing for a pulley arranged therewith can be driven with a belt arranged such that its center as seen in width is offset relative to a center of the bearing. As such, the above described bearing experiences a radial load and in addition a moment load and the bearing for the pulley has a component periodically experiencing a tensile stress component inducing generated hydrogen to enter into the steel.

At least one of the rolling element and inner and outer rings containing austenite grains reduced in size to achieve a grain size number exceeding 10 that is combined with a nitrogen enriched layer can significantly reduce hydrogen embrittlement or cracking not only in a bearing for an alternator but also a bearing for a pulley. Furthermore, the effect of providing at least one of the rolling element and inner and outer rings with a fracture stress value of 2,650 MPa and the effect of providing it with a hydrogen content of no more than 0.5 ppm can be considered similarly as considered for the bearing for the alternator.

In the present bearing for the pulley at least one of the rolling element and the inner and outer rings having the nitrogen enriched layer may have a surface layer containing globular carbide having an area ratio of no less than 10%.

The bearing for the pulley that has a surface layer containing globular carbide having an area ratio of no less than 10% can further be enhanced in resistance to hydrogen embrittlement or cracking.

In the above described bearings for the alternator and pulley, respectively, at least one of the rolling element, the inner ring and the outer ring can be formed of material of steel of SUJ2 as defined by JIS. By subjecting the bearing's member of material of steel SUJ2 to the above-described, low-temperature secondary quenching, fine austenite grains, a high fracture stress value and a low hydrogen content, as described above, can be readily obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
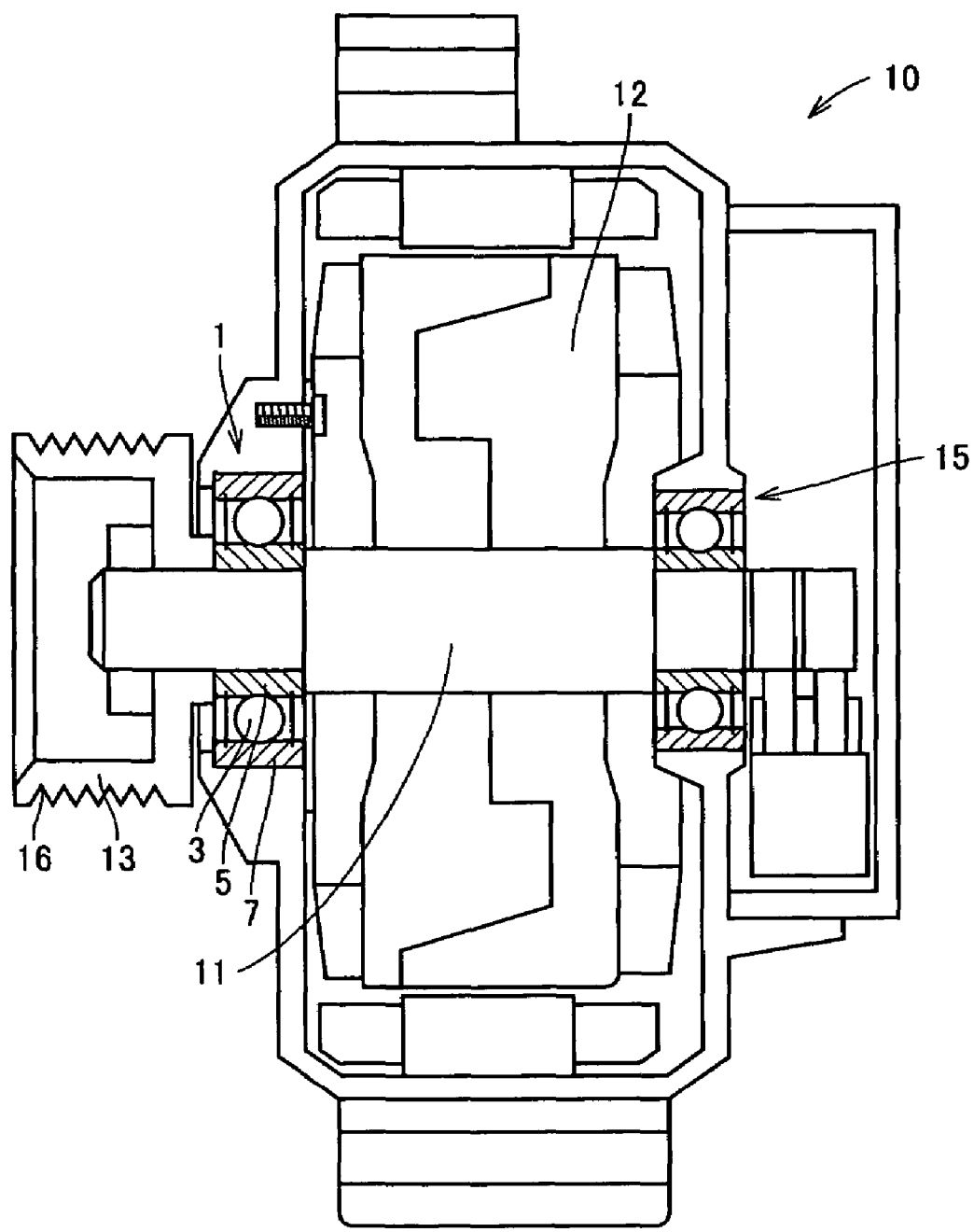
FIG. 1 shows an alternator including a bearing for an alternator in accordance with the present invention in an embodiment.

Reference will now be made to the drawings to describe the present invention in embodiment. FIG. 1 shows an alternator 10. A bearing 1, 15 for the alternator receives a shaft 11 inserted therethrough. The shaft has an end protruding outer than the bearing and having a pulley 13 attached thereto. Pulley 13 has a groove 16 along which a transmission belt (not shown) is wound and thus engaged with.

Bearing 1 is located between a rotor 12 fixed to shaft 12 at a center and pulley 13 and is referred to as a front bearing. The other alternator 15 is located between rotor 12 and the other end and referred to as a rear bearing. The front and rear bearings are both attached to a housing. The present invention may be directed to either the front or rear bearing, although it should be noted that front bearing 1 is more liable to hydrogen embrittlement or cracking as it is located between pulley 13 and rotor 12 and experiences a large bending moment or other similar stress.

Figure 2:
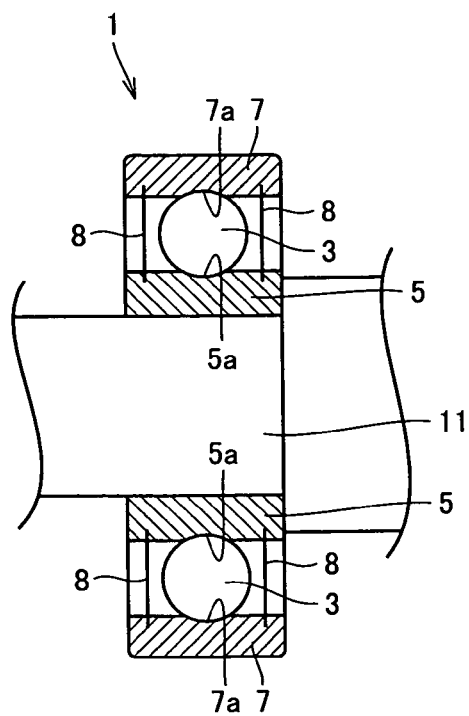
FIG. 2 is an enlarged view of the FIG. 1 bearing.

FIG. 2 is an enlarged view of the FIG. 1 front bearing 1. Front bearing 1 is configured of an inner ring 5, an outer ring 7, a rolling element 3 and a seal 8. Inner and outer rings 5 and 7 have rolling contact surfaces 5a and 7a, respectively, together holding rolling element 3. The rolling element may be formed of steel or ceramic. Inner ring 5 is press-fitted on shaft 11, and shaft 11 is rotatably supported. Furthermore, rolling element 3 is held by a cage (not shown) and between inner and outer rings 5 and 7 at opposite ends seal 8 is arranged to seal the bearing's interior. In the sealed interior there is a space in which grease is enclosed.

Figure 3:
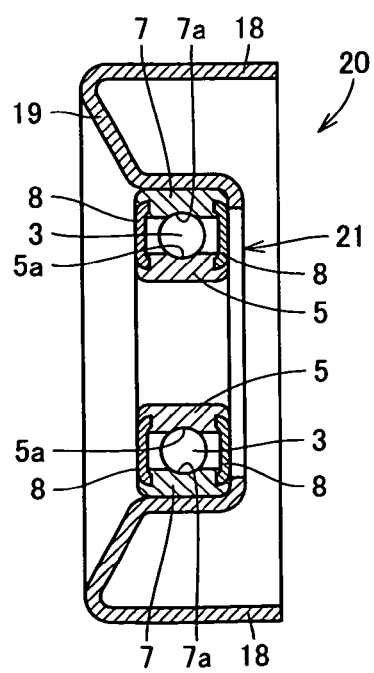
FIG. 3 shows a bearing for a pulley in accordance with the present invention.

FIG. 3 shows a pulley 20 including a bearing 21 for the pulley in accordance with the present invention in an embodiment. Pulley 20 includes a main body 19 fitted on the bearing's outer ring 7 externally, and a portion 18 receiving a belt wound therearound. Bearing 21 is configured of inner ring 5, outer ring 7, rolling element 3 and seal 8. Inner and outer rings 5 and 7 have rolling contact surfaces 5a and 7a, respectively, together holding rolling element 3 therebetween. Main body 19 externally fitted on outer ring 7 is rotatably supported. Furthermore, rolling element 3 is held by a cage (not shown) and between inner and outer rings 5 and 7 at opposite ends seal 8 is arranged to seal the bearing's interior. In the sealed interior there is a space in which grease is enclosed.

Furthermore in FIG. 3 inner ring 5 may be integrated with a shaft used to attach pulley 20 to a counterpart member. More specifically, it may include such a type that a shaft has an outer diameter with a groove.

In the above described bearing, at least one of outer ring 7, inner ring 5 and rolling element 3 contains steel having a nitrogen enriched layer and contains austenite grains having a grain size number exceeding 10. Alternatively, at least one of outer ring 7, inner ring 5 and rolling element 3 contains steel having a nitrogen enriched layer and also achieve a fracture stress value of no less than 2650 MPa. Alternatively, at least one of outer ring 7 inner ring 5 and rolling element 3 contains steel having a nitrogen enriched layer and a hydrogen content of no more than 0.5 ppm.

The above described, at least one of the inner and outer rings and the rolling element used at a high velocity and under a high surface pressure which are enclosed by grease, hardly provides hydrogen embrittlement or cracking and can be increased in longevity.

These rolling bearings have at least one of their outer and inner rings and rolling elements undergoing a thermal treatment including carbonitriding.

Figure 4:
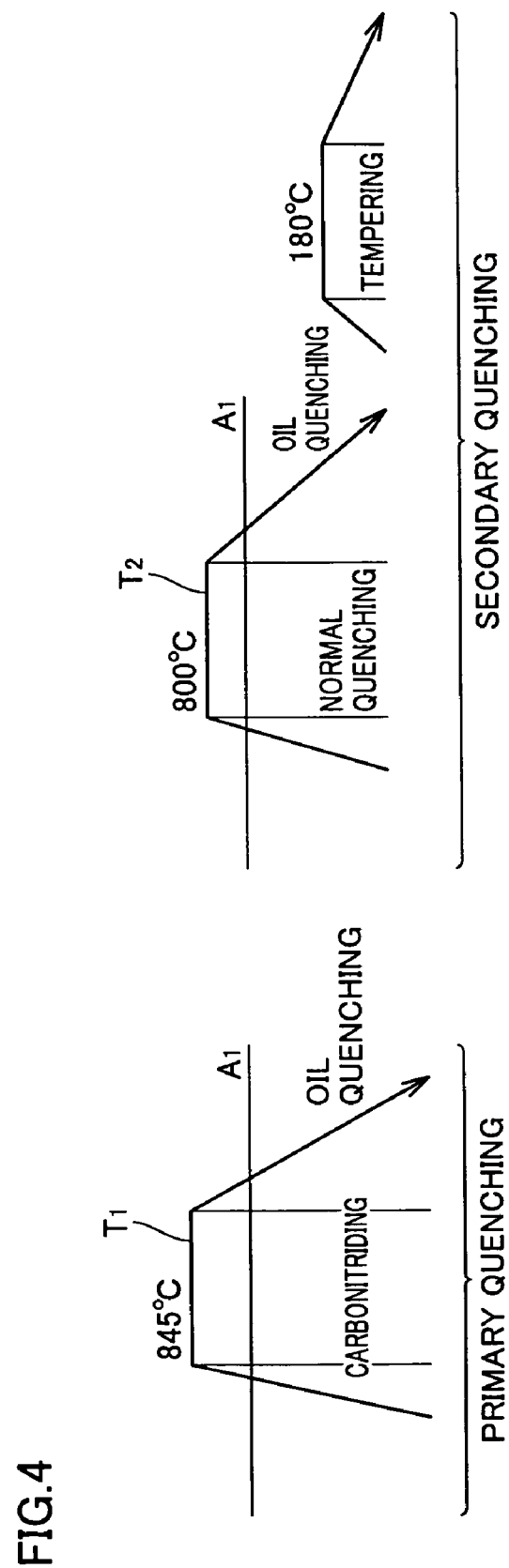
FIG. 4 represents an exemplary thermal treatment applied to at least one of a rolling elements, an inner ring and an outer ring of bearings for an alternator and a pulley, respectively, in accordance with the present invention in an embodiment.
Figure 5:
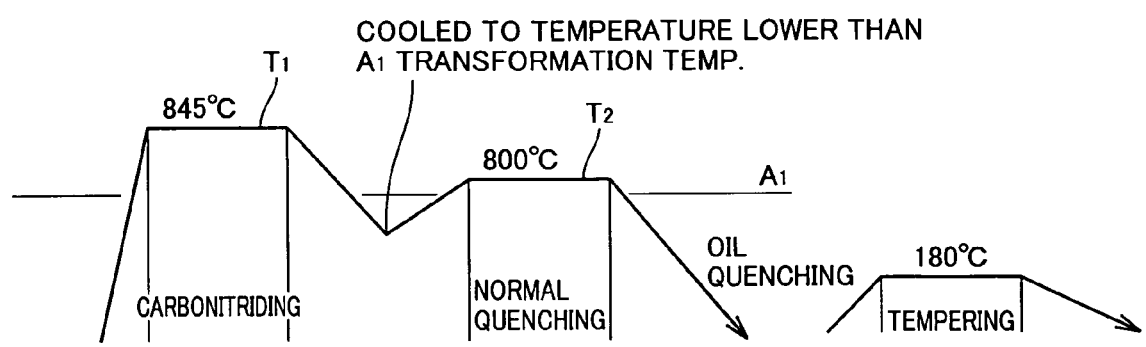
FIG. 5 represents another exemplary thermal treatment applied to at least one of a rolling elements, an inner ring and an outer ring of bearings for an alternator and a pulley, respectively.

FIG. 4 shows a thermal treatment pattern according to which primary quenching and secondary quenching are carried out, and FIG. 5 shows a thermal treatment pattern according to which a material is cooled to a temperature lower than the A1 transformation temperature in a quenching process and thereafter heated again to be finally quenched. Both are embodiments of the present invention. Referring to these figures, in process T1, carbon and nitrogen are diffused through a steel matrix while the carbon is sufficiently dissolved therein, and thereafter cooling is done to a temperature below the A1 transformation temperature. Then, in process T2 shown in the drawings, heating is done again to a temperature lower than that in process T1 and then oil-quenching is performed.

The above described thermal treatments both allow their carbonitriding processes to produce a nitrogen-enriched layer that is a "carbonitrided layer." Since the material for the carbonitriding process, the steel, has a high concentration of carbon, carbon in the atmosphere of the normal carbonitriding process might not enter the surface of the steel easily. For example, with steel having a high concentration of carbon (approximately 1% by weight), a carburized layer may have a higher concentration of carbon than this value, or a carburized layer may be formed without having a higher concentration of carbon than this value. A concentration of nitrogen in normal steel, however, is typically as low as approximately no more than 0.025 wt % at the maximum although it depends on a concentration of Cr or the like. Therefore, a nitrogen enriched layer can apparently be formed regardless of the concentration of carbon in source steel. It will be appreciated that the above described nitrogen enriched layer may also be enriched with carbon.

Compared with normal quenching, by which carbonitriding is done and immediately thereafter quenching is done once, the above discussed thermal treatment can provide enhanced crack strength and reduced secular dimensional variation rate while carbonitriding the surface layer. This thermal treatment can also produce a microstructure having austenite crystal grains of a grain size smaller than conventional by one half or more. A bearing component subjected to the above described thermal treatment can have a long rolling fatigue life, an increased anti-crack strength, and a reduced secular dimensional variation rate, and also exhibit significant resistance to hydrogen embrittlement or cracking.

Figure 6A:
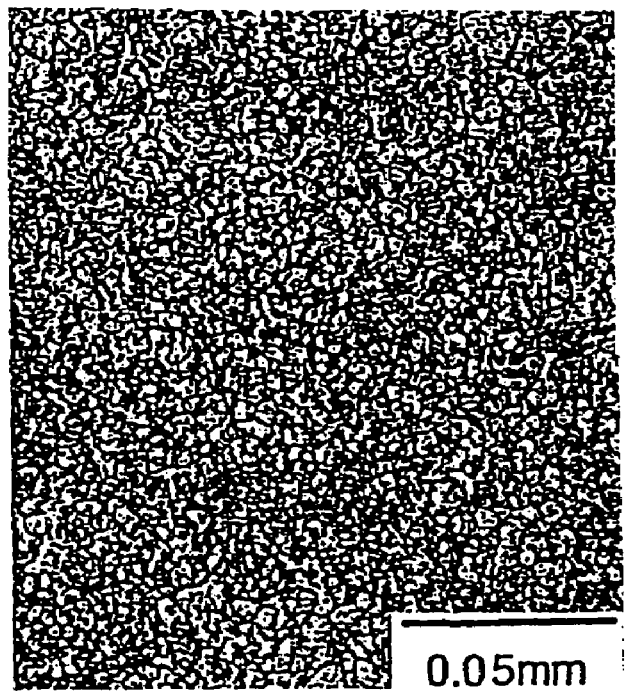
FIGS. 6A and 6B show a microstructure, particularly austenite grains, of a bearing component, FIG. 6A showing a bearing component of the present invention and FIG. 6B showing a conventional bearing component.
Figure 6B:
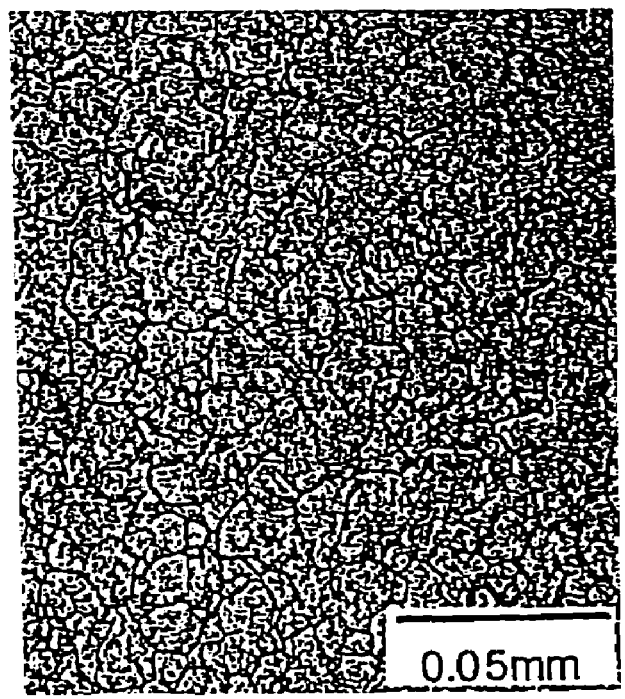
Figure 7A:
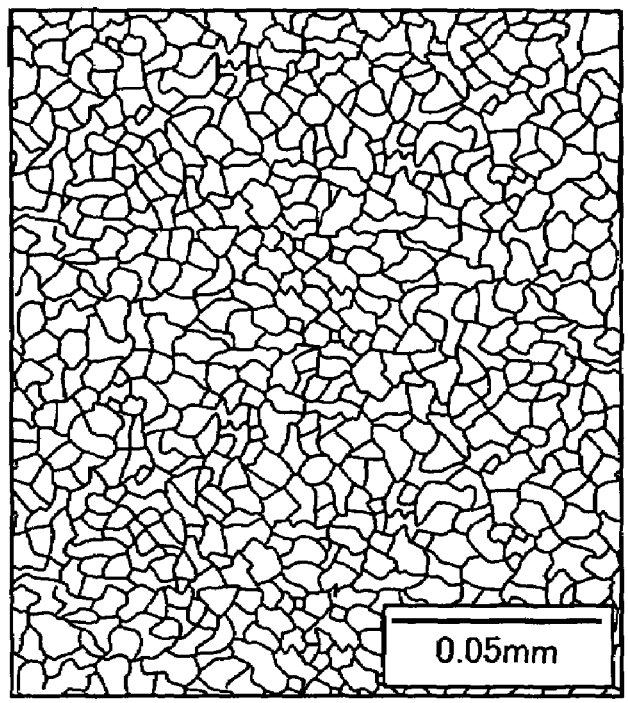
FIGS. 7A and 7B diagrammatically show austenite grain corresponding respectively to FIGS. 6A and 6B.
Figure 7B:
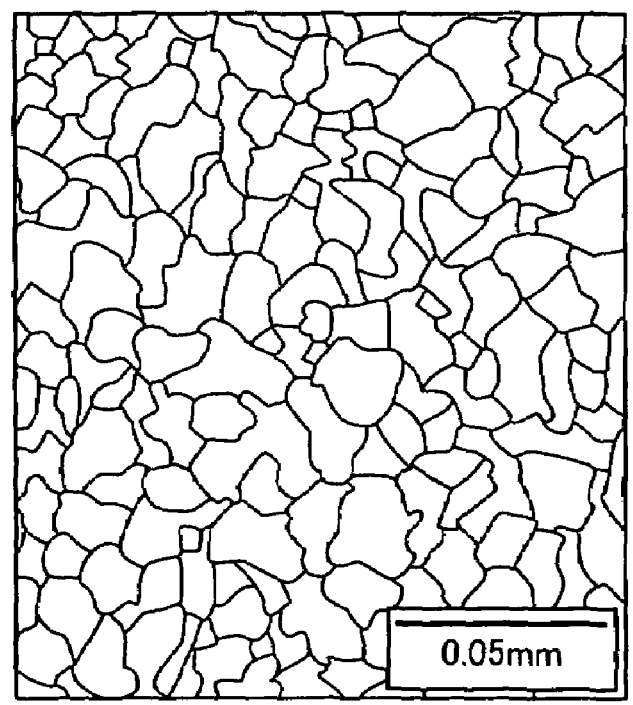

FIG. 6A shows a grain of austenite of a bearing steel having been heat-treated as shown in FIG. 4. For comparison, FIG. 6B shows a grain of austenite of a bearing steel which has undergone the conventional thermal treatment. FIGS. 7A and 7B diagrammatically show the grains of austenite that are shown in FIGS. 6A and 6B. In the structures with the crystal grains of austenite, the grain diameter of the conventional austenite is 10 which is a grain size number defined by JIS while that of the present invention through the thermal treatment thereof is for example 12 and thus fine grains are seen. Further, the average grain diameter in FIG. 6A is 5.6 μm measured by the intercept method.

The present invention in examples will now be described.

EXAMPLE 1

JIS-SUJ2 (1.0 wt % of C—0.25 wt % of Si—0.4 wt % of Mn—1.5 wt % of Cr) was used for Example 1 of the present invention. Samples shown in Table 1 were each produced through the procedure described below.

JIS G4805 SUJ2 specifies the range of chemistry as follows:
C: 0.95-1.10 wt %, Si: 0.15-0.35 wt %, Mn: ≦0.50 wt %, P: ≦0.025 wt %, S: ≦0.025 wt %, Cr: 1.30-1.60 wt %

TABLE 1

| | sample | | | | | | conventional carbonitrided sample | normal quenched sample |
|---|---|---|---|---|---|---|---|---|
| | A | B | C | D | E | F | | |
| secondary quenching temperature (° C.) | 780[1] | 800 | 815 | 830 | 850 | 870 | — | — |
| hydrogen amount (ppm) | — | 0.37 | 0.40 | 0.38 | 0.42 | 0.40 | 0.72 | 0.38 |
| crystal grain size (JIS) | — | 12 | 11.5 | 11 | 10 | 10 | 10 | 10 |
| Charpy impact value (J/cm$^2$) | — | 6.65 | 6.40 | 6.30 | 6.20 | 6.30 | 5.33 | 6.70 |
| fracture stress (MPa) | — | 2840 | 2780 | 2650 | 2650 | 2700 | 2330 | 2770 |
| relative rolling fatigue life (L$_{10}$) | — | 5.4 | 4.2 | 3.5 | 2.9 | 2.8 | 3.1 | 1 |

[1] evaluation failed due to insufficient quenching

Samples A-D

Examples of the Present Invention

Carbonitriding was performed at 850° C. held for 150 minutes in an atmosphere of a mixture of RX gas and ammonia gas. Following the thermal treatment pattern shown in FIG. 4, primary quenching was done from a carbonitriding temperature of 850° C., and secondary quenching was subsequently done by heating to a temperature in a temperature range from 780° C. to 830° C. lower than the carbonitriding temperature. Sample A with a secondary quenching temperature of 780° C. was not tested since quenching of sample A was insufficient.

Samples E and F

Comparative Examples

These samples were carbonitrided through the same procedure as that of samples A-D of the present invention, and then secondary quenched at a temperature from 850° C. to 870° C. equal to or higher than the carbonitriding temperature of 850° C.

Conventional Carbonitrided Sample: Comparative Example

Carbonitriding was performed at 850° C. held for 150 minutes in an atmosphere of a mixture of RX gas and ammonia gas. Quenching was successively done from the carbonitriding temperature and no secondary quenching was done.

Normal Quenched Sample: Comparative Example

Without carbonitriding, quenching was done by increasing the temperature to 850° C. and no secondary quenching was done.

For the samples above, tests were conducted for (1) measuring the amount of hydrogen, (2) measuring crystal grain size, (3) Charpy impact test, (4) measuring fracture stress and (5) rolling fatigue test, by the methods described below.

I. Test Methods for Example 1

(1) Measurement of Hydrogen Amount

The amount of hydrogen was determined by means of a DH-103 hydrogen determinator manufactured by LECO Corporation to analyze the amount of non-diffusible hydrogen in a steel. The amount of diffusible hydrogen was not measured. Specifications of the LECO DH-103 hydrogen determinator are as follows:

Analysis range: 0.01-50.00 ppm
Analysis precision: ±0.1 ppm or ±3% H (higher one)
Analysis sensitivity: 0.01 ppm
Detection method: thermal conductimetry
Sample weight size: 10 mg-35 g (max: 12 mm (diameter)× 100 mm (length))
Furnace temperature range: 50° C.-1100° C.
Reagent: anhydron Mg(ClO$_4$)$_2$, Ascarite and NaOH
Carrier gas: nitrogen gas
Dosing gas: hydrogen gas
(Both gases have a purity of at least 99.99% and a pressure of 40 PSI (2.8 kgf/cm$^2$).)

The procedure of the analysis is roughly described here. A sample was taken by a dedicated sampler and the sample together with the sampler was put into the hydrogen determiner. Diffusible hydrogen therein was directed by the nitrogen carrier gas to a thermal conductimetry detector. The diffusible hydrogen was not measured in this example. Then, the sample was taken out of the sampler to be heated in a resistance heater and non-diffusible hydrogen was directed by the nitrogen carrier gas to the thermal conductimetry detector. The thermal conductivity was measured by the thermal conductimetry detector to determine the amount of non-diffusible hydrogen.

(2) Measurement of Crystal Grain Size

The crystal grain size was measured according to the method of testing the crystal grain size of austenite in a steel defined by JIS G 0551.

(3) Charpy Impact Test

A Charpy impact test was conducted according to the Charpy impact test method for a metal material defined by JIS Z 2242. A test piece used here was a U-notch test piece (JIS No. 3 test piece) defined by JIS Z 2202.

(4) Measurement of Fracture Stress

Figure 8:
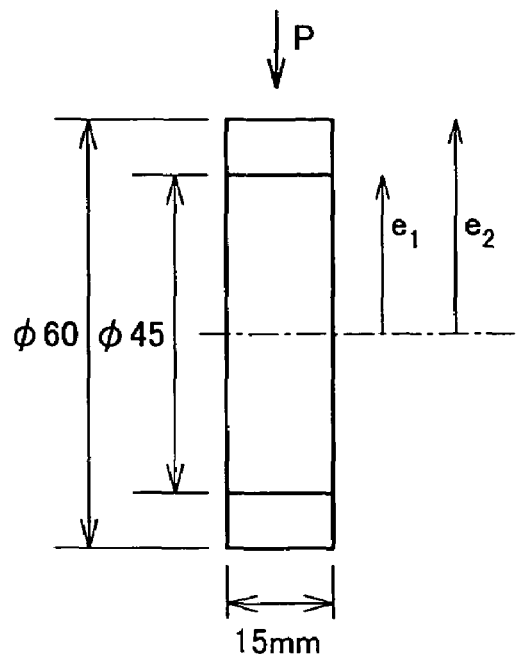
FIG. 8 shows a test piece for testing static pressure fracture-strength (measuring fracture stress)

FIG. 8 shows a test piece for a static-pressure fracture-strength test (for measuring fracture stress). A load was exerted in direction P in FIG. 8 and the load when the test piece was fractured was measured. Then, the measured load which was a fracture load was converted into a stress by the following stress calculation formula for a curved beam. It is noted that the test piece to be used is not limited to the one shown in FIG. 13 and may be any test piece having a different shape.

Suppose that a fiber stress on the convex surface of the test piece shown in FIG. 8 is $\sigma_1$ and a fiber stress on the concave surface is $\sigma_2$, then, $\sigma_1$ and $\sigma_2$ are determined by the following formula (JSME Mechanical Engineer's Handbook, A4-strength of materials, A4-40). Here, N indicates an axial force of a cross section including the axis of the annular test piece, A indicates a cross-sectional area, $e_1$ indicates an outer radius, $e_2$ indicates an inner radius, and $\kappa$ is a section modulus of the curbed beam.

$$\sigma_1 = (N/A) + \{M/(A\rho_o)\}[1 + e_1/\{\kappa(\rho_o + e_1)\}]$$

$$\sigma_2 = (N/A) + \{M/(A\rho_o)\}[1 - e_2/\{\kappa(\rho_o - e_2)\}]$$

$$\kappa = -(1/A)\int A\{\eta/(\rho_o + \eta)\}dA$$

(5) Rolling Fatigue Test

Figure 9A:
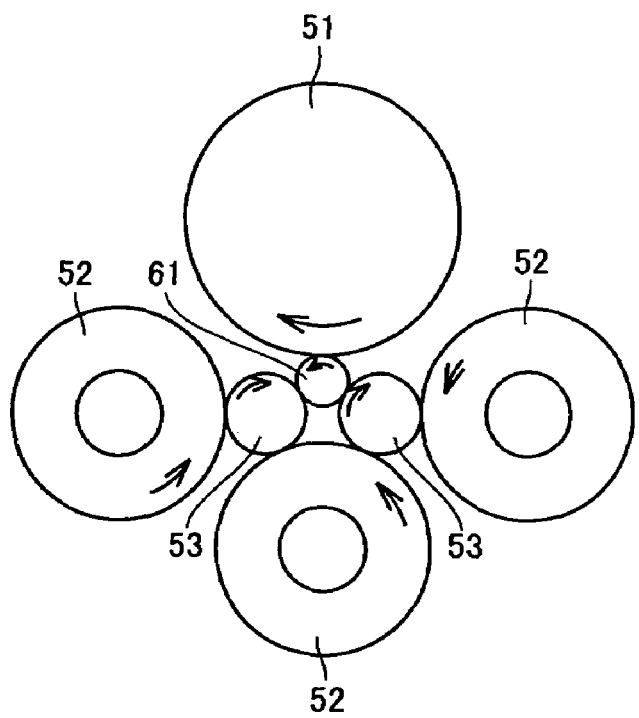
FIG. 9A is a front view of a rolling fatigue life tester and FIG. 9B is a side view thereof.
Figure 9B:
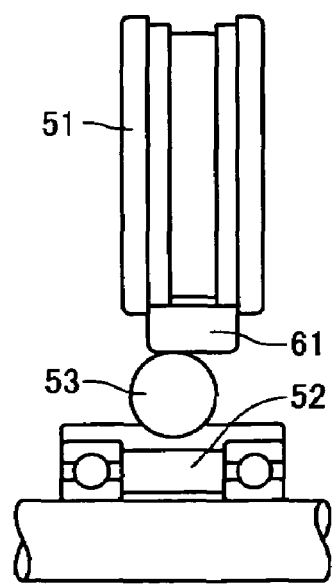

Test conditions for a rolling fatigue life test are shown in Table 2. FIGS. 9A and 9B schematically show a rolling fatigue life tester, FIG. 9A being a cross-sectional view and FIG. 9B being a side view thereof. Referring to FIGS. 9A and 9B, a test piece 61 undergoing the rolling fatigue life test was driven by a driving roll 51 to rotate while being in contact with balls 53. Balls 53 were (¾)" balls guided by a guiding roll 52 to roll. Balls 53 exerted a high surface pressure on test piece 61 while test piece 61 also exerted a high surface pressure on balls 53.

II. Results of Tests for Example 1

(1) Amount of Hydrogen

As shown in table 1, the conventional carbonitrided sample without being additionally processed has a considerably large hydrogen amount of 0.72 ppm. A reason therefor is considered that ammonia ($NH_3$) contained in the atmosphere in the carbonitriding process is decomposed and then hydrogen enters the steel. On the other hand, the hydrogen amount of samples B-D is reduced to 0.37-0.40 ppm and thus almost a half of that of the conventional sample. This amount of hydrogen is substantially equal to that of the normal quenched sample.

The above-mentioned reduction of the hydrogen amount can lessen the degree of embrittlement of the steel that is due to hydrogen in the solid solution. In other words, by the reduction of the hydrogen amount, the Charpy impact value of samples B-D of the present invention is remarkably improved.

(2) Crystal Grain Size

Regarding the crystal grain size, samples that are secondary quenched at a temperature lower than the quenching temperature in the carbonitriding process (primary quenching), namely samples B-D have austenite grains which are remarkably made fine, i.e., crystal grain size number is 11-12. Samples E and F as well as the conventional carbonitrided sample and the normal quenched sample have austenite grains with the crystal grain size number of 10, which means that the crystal grain size of samples E and F is greater than that of samples B-D of the present invention.

(3) Charpy Impact Test

Table 9 shows that the Charpy impact value of the conventional carbonitrided sample is 5.33 $J/cm^2$ while that of samples B-D of the present invention is higher, ranging from 6.30 to 6.65 $J/cm^2$. It is also seen from this that a lower secondary quenching temperature leads to a higher Charpy impact value. The normal quenched sample has a high Charpy impact value of 6.70 $J/cm^2$.

(4) Measurement of Fracture Stress

The fracture stress corresponds to anti-crack strength. It is seen from Table 1 that the fracture stress of the conventional carbonitrided sample is 2330 MPa. On the other hand, the fracture stress of samples B-D is improved to 2650-2840 MPa. The normal quenched sample has a fracture stress of 2770 MPa which is in the range of the. fracture stress of samples B-F. It is considered that the reduction in hydrogen content greatly contributes to the improved anti-crack strength of samples B-D as well as the reduction in size of austenite crystal grains.

(5) Rolling Fatigue Test

According to Table 1, the normal quenched sample has the shortest rolling fatigue life (L10) due to the absence of carbonitrided layer in the surface layer. In contrast, the rolling fatigue life of the conventional carbonitrided sample is 3.1 times as long as that of the normal quenched sample. The rolling fatigue life of samples B-D is remarkably improved as compared with the conventional carbonitrided sample. Samples E and F of the present invention have the rolling fatigue life almost equal to that of the conventional carbonitrided sample.

In summary, samples B-D of the present invention have the lower hydrogen content, finer austenite crystal grains with the crystal grain size number of at least 11, and improved Charpy impact value, anti-crack strength and rolling fatigue life.

EXAMPLE 2

Example 2 of the present invention is now described. On the following samples X, Y and Z, a series of tests was conducted. A material to be heat-treated that was employed commonly to samples X-Z was JIS-SUJ2 (1.0 wt % of C—0.25 wt % of Si—0.4 wt % of Mn—1.5 wt % of Cr). Samples X-Z were each processed through the following procedure.

Sample X—comparative example: normal quenching only (without carbonitriding)

Sample Y—comparative example: quenching directly after carbonitriding (conventional carbonitriding and quenching) Carbonitriding was conducted at 845° C. held for 150 minutes. The atmosphere in the carbonitriding process was a mixture of RX gas and ammonia gas.

Sample Z—example of the present invention: A bearing material was processed following the thermal treatment pattern shown in FIG. 4. Carbonitriding was conducted at 845° C. held for 150 minutes. The atmosphere in the carbonitriding process was a mixture of RX gas and ammonia gas. Final quenching temperature was 800° C.

(1) Rolling Fatigue Life

Test conditions and the test device for the rolling fatigue life test are as shown in Table 2 and FIGS. 9A and 9B. Results of the rolling fatigue life test are shown in Table 3.

TABLE 2

| | |
|---|---|
| test piece | φ12 × L22 cylindrical test piece |
| number of tested pieces | 10 |
| counterpart steel ball | ¾" (19.05 mm) |
| contact surface pressure | 5.88 GPa |
| load speed | 46240 cpm |
| lubricating oil | turbine VG68 - forced circulation lubrication |

TABLE 3

| | life (load count) | | |
|---|---|---|---|
| sample | $L_{10}$ (×10⁴ times) | $L_{10}$ (×10⁴ times) | relative $L_{10}$ |
| X | 8017 | 18648 | 1.0 |
| Y | 24656 | 33974 | 3.1 |
| Z | 43244 | 69031 | 5.4 |

According to Table 3, sample Y which is a comparative example has a rolling fatigue life (L10 life: one out of ten test pieces being damaged) that is 3.1 times as long as that of sample X which is also a comparative example and undergoes normal quenching only, and thus it is seen that the effect of extending the life is obtained through the carbonitriding process. In contrast, sample Z of the present invention has a longer life which is 1.74 times as long as that of sample Y and 5.4 times as long as that of sample X. It is considered that this improvement is obtained mainly from the fine microstructure.

(2) Charpy Impact Test

A Charpy impact test was conducted by using a U-notch test piece defined by JIS Z 2242 mentioned above. Test results are shown in Table 4.

TABLE 4

| sample | Charpy impact value (J/cm²) | relative impact value |
|---|---|---|
| X | 6.7 | 1.0 |
| Y | 5.3 | 0.8 |
| Z | 6.7 | 1.0 |

Sample Y (comparative example) having undergone carbonitriding has a Charpy impact value which is not larger than that of sample X (comparative example) having undergone normal quenching, while sample Z has a Charpy impact value equivalent to that of sample X.

(3) Static Fracture Toughness Test

Figure 10:
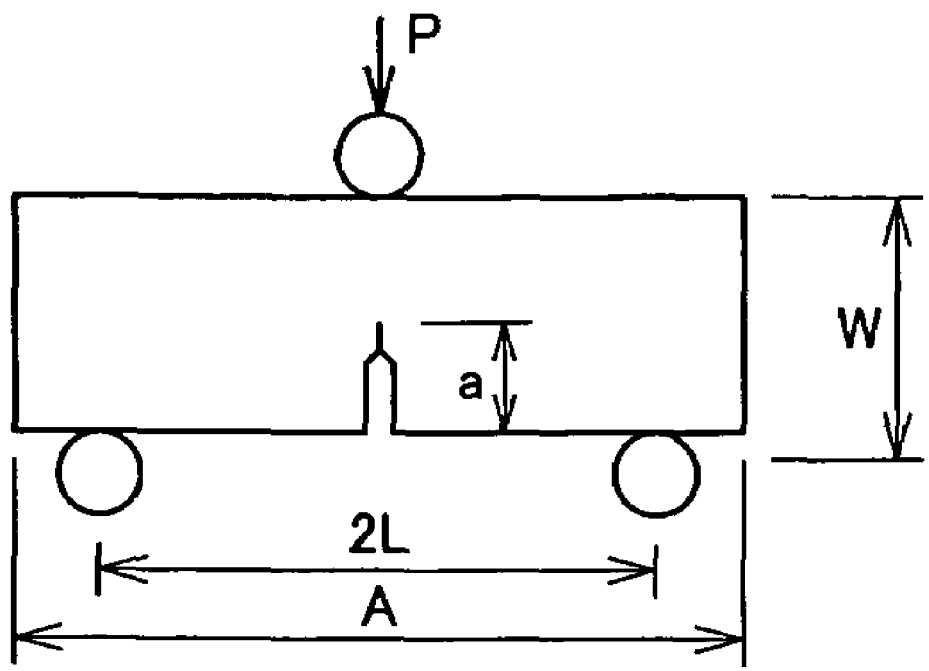
FIG. 10 shows a test piece for testing static fracture toughness.

FIG. 10 shows a test piece for a static fracture toughness test. In the notch of the test piece, a pre-crack of approximately 1 mm was made, thereafter a static load by three-point bending was added, and then a fracture load P was determined. Using the following formula (I), a fracture toughness value (KIc value) was calculated. Results of the test are shown in Table 5.

$$KIc=(PL\sqrt{a}/BW^2)\{5.8-9.2(a/W)+43.6(a/W)^2-75.3(a/W)^3+77.5(a/W)^4\} \quad (I)$$

TABLE 5

| sample | number tested | $K_1C$ (MPa√m) | relative $K_1C$ |
|---|---|---|---|
| X | 3 | 16.3 | 1.0 |
| Y | 3 | 16.1 | 1.0 |
| Z | 3 | 18.9 | 1.2 |

As the pre-crack has a depth greater than the depth of the carbonitrided layer and thus the same results are obtained for samples X and Y (comparative examples), while the result for sample Z (example of the present invention) is approximately 1.2 times as high as that of the comparative examples.

(4) Static-Pressure Fracture-Strength Test (Measurement of Fracture Stress)

A static-pressure fracture-strength test piece as shown in FIG. 8 described above was used. A load was exerted in direction P in FIG. 13 to conduct a static-pressure fracture-strength test. Test results are shown in Table 6.

TABLE 6

| sample | number tested | static fracture strength (kgf) | relative static fracture strength |
|---|---|---|---|
| X | 3 | 4200 | 1.00 |
| Y | 3 | 3500 | 0.84 |
| Z | 3 | 4300 | 1.03 |

Sample Y having been carbonitrided has a strength somewhat smaller than that of sample X having undergone normal quenching, while sample Z of the present invention has an improved static-pressure fracture-strength compared with sample Y and is thus equivalent to that of sample X.

(5) Rate of Secular Dimensional Change

Table 7 shows the rate of secular dimensional change measured under the conditions of 130° C. (holding temperature) and 500 hours (holding time), together with the surface hardness and the amount of retained austenite (0.1 mm depth).

TABLE 7

| sample | number tested | surface hardness (HRC) | retained $\gamma$ (%) | rate of dimensional change (×10⁻⁵) | relative rate of dimensional change*⁾ |
|---|---|---|---|---|---|
| X | 3 | 62.5 | 9.0 | 18 | 1.0 |
| Y | 3 | 63.6 | 28.0 | 35 | 1.9 |
| Z | 3 | 60.0 | 11.3 | 22 | 1.2 |

*⁾smaller is superior

As compared with the rate of dimensional change of sample Y having a large amount of retained austenite, sample Z of the present invention has the smaller rate of dimensional change due to the lower amount of retained austenite which is one-half or less.

(6) Life Test under Contaminated Lubricant Condition

Ball bearing 6206 was used to evaluate the rolling fatigue life under a contaminated lubricant condition having a predetermined amount of normal contaminants mixed therein. Test conditions are shown in Table 8 and test results are shown in Table 9.

TABLE 8

| | |
|---|---|
| load | Fr = 6.86 kN |
| contact surface pressure | Pmax = 3.2 Gpa |
| rotational speed | 2000 rpm |

TABLE 8-continued

| lubricant | turbine 56 - oil bath lubrication |
|---|---|
| amount of contaminant | 0.4 g/1000 cc |
| contaminant | grain size: 100-180 μm, hardness: Hv800 |

TABLE 9

| sample | $L_{10}$ life_(h) | relative $L_{10}$ |
|---|---|---|
| X | 20.0 | 1.0 |
| Y | 50.2 | 2.5 |
| Z | 74 | 3.7 |

Sample Y having undergone conventional carbonitriding has a lifetime which is approximately 2.5 times as long as that of sample X, and sample Z of the present invention has a lifetime which is approximately 3.7 times as long as that of sample X. While sample Z of the present invention has a smaller amount of retained austenite than that of sample Y of the comparative example, sample Z has a long lifetime substantially equivalent to that of sample Y because of influences of entering nitrogen and the fine microstructure.

It is accordingly seen from the above-discussed results that, sample Z of the present invention, namely a bearing component produced by the thermal treatment method of the present invention can simultaneously achieve three goals: extension of the rolling fatigue life that has been difficult to achieve by the conventional carbonitriding, improvement in crack strength and reduction of the rate of secular dimensional change.

EXAMPLE 3

Figure 11:
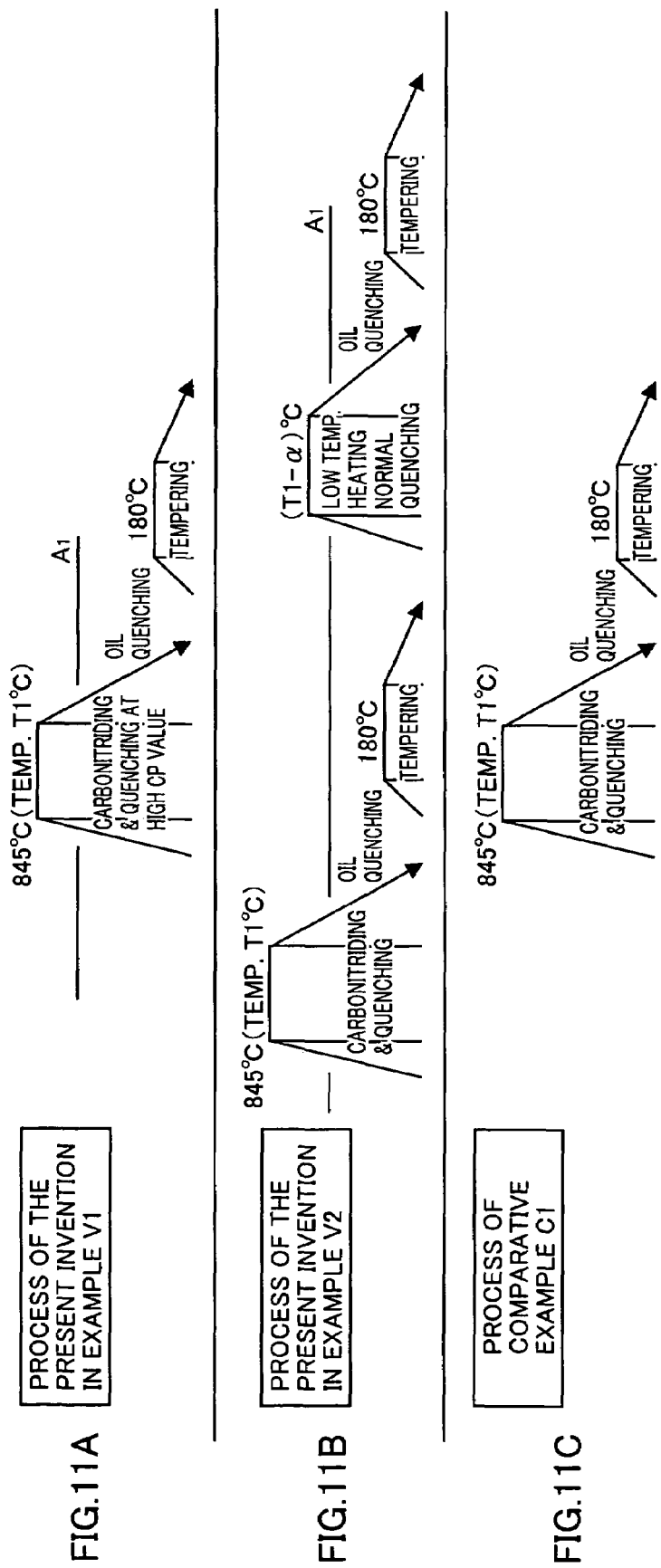
FIGS. 11A-11C represent processes in accordance with the present invention in examples V1 and V2 and a comparative example C1, respectively.

SUJ2 having undergone two types of processes as shown in FIGS. 11A and 11B was prepared as a material of steel as an example of the present invention minimizing hydrogen embrittlement or cracking, as described above.

FIG. 11A represents the present invention in an example V1 providing a process. More specifically, steel is carbonitrided at a high carbon potential (CP) value of 1.3-1.6 and then from that temperature the steel is oil-quenched. The steel carbonitrided in an ambient with such a high CP value can have a surface layer containing globular or spherodized carbide having an area ratio of no less than 10%. The steel is then tempered at 180° C.

FIG. 11B represents the present invention in an example V2 providing a process. More specifically, steel is initially carbonitrided and quenched, as shown in comparative example C1 (see FIG. 11C), and then heated to T1° C. (845° C.)–α° C., a temperature lower than an initial quenching temperature by α° C., and oil-quenched. The temperature (T1–α)° C. is no lower than the A1 transformation temperature and lower than the temperature of the preceding, carbonitriding and quenching step. As shown in the figure, quenching the steel starts at the temperature of the carbonitriding step, and the quenching temperature and the carbonitriding temperature are the same. In the present description, a process performed to heat a medium to (T1–α)° C. and quench it will be referred to as low-temperature quenching. After the medium is low-temperature quenched, it is tempered at 180° C.

Furthermore, as a material of steel for a comparative example, four materials of steel, i.e., SUJ2 processed as shown in FIG. 11C, SUJ2 normally quenched, SUJ2 blackened, and 13% Cr steel are used for evaluation for comparison. Table 10 is a list of materials of steel evaluated.

TABLE 10

List of Subjects to be Evaluated

| | Type of Steel | Process | Note |
|---|---|---|---|
| Invention in Ex. V1 | JIS-SUJ2 | See FIG. 1 | Large amount of globular carbide |
| Invention in Ex. V2 | JIS-SUJ2 | See FIG. 1 | Fine crystal grains + large amount of globular carbide |
| Comparative Ex. C1 | JIS-SUJ2 | See FIG. 1 | Nitrided layer |
| Comparative Ex. C2 | JIS-SUJ2 | Normally quenched | — |
| Comparative Ex. C3 | JIS-SUJ2 | Normally quenched + blackened | Oxide film |
| Comparative Ex. C4 | 13% Cr steel | Normally quenched | Passive thin coating (oxide film) |

Figure 12:
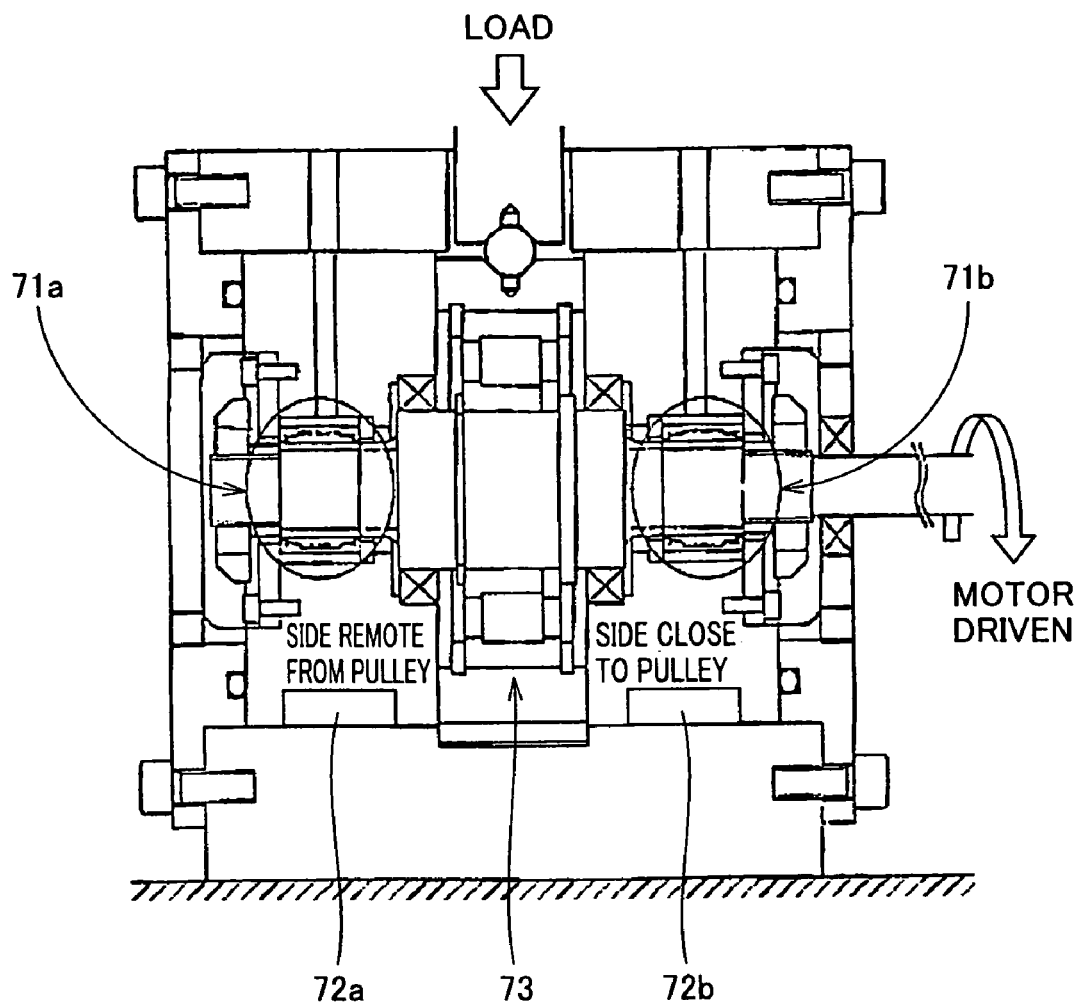
FIG. 12 shows a tester reproducing hydrogen embrittlement or cracking.

They were evaluated for hydrogen embrittlement or cracking in a test using a radio load tester as shown in FIG. 12. A bearing 71a, 71b to be tested was incorporated into two, opposite sides of a main shaft supported by a bearing 73 attached to a center and rotated via a pulley as it is driven by a servo motor. The bearing to be tested receives a radial, biased load and thus flexes as bearing 73 receives a radial load. Bearing 71a, 71b to be tested is controlled in temperature by a cartridge heater 72a, 72b attached to a bearing housing. This evaluation test was conducted with bearing 71a, 71b in the form of a radial needle bearing having an outer diameter of 32 mm, an inner diameter of 24 mm, and a length of 19.8 mm. The test was conducted under conditions as shown in Table 11.

TABLE 11

Test Conditions

| | |
|---|---|
| Contact surface pressure (GPa) Inner ring-side/outer ring-side | 2.61/2.26 |
| Rate of rotation (rpm) | Rapid acceleration and deceleration of 500 ←→ 3,000 |
| Testing temperature (° C.) | 100 |
| Lubricant | Water-glycol based, incombustible, working oil |
| Condition of lubrication | Oil bath |

The Table 11 test conditions with rapid acceleration and deceleration allow a sufficient reproduction of hydrogen embrittlement or cracking. Table 12 shows a result of the test conducted under these conditions.

TABLE 12

Test Result

| | Type of Steel | Process | No. of N | $L_{10}$ Longevity (h) | $L_{10}$ Longevity ratio |
|---|---|---|---|---|---|
| Invention in Ex. V1 | JIS-SUJ2 | See FIG. 1 | 10 | 54.3 | 4.6 |
| Invention in Ex. V2 | JIS-SUJ2 | See FIG. 1 | 10 | >122.2*[1] | >10.3 |
| Comparative Ex. C1 | JIS-SUJ2 | See FIG. 1 | 10 | 32.6 | 2.7 |
| Comparative Ex. C2 | JIS-SUJ2 | Normally quenched | 10 | 11.9 | 1.0 |
| Comparative Ex. C3 | JIS-SUJ2 | Normally quenched + blackened | 6 | 62.5*[2] | 5.3 |
| Comparative Ex. C4 | 13% Cr steel | Normally quenched | 6 | 70.6*[2] | 5.9 |

Figure 13A:
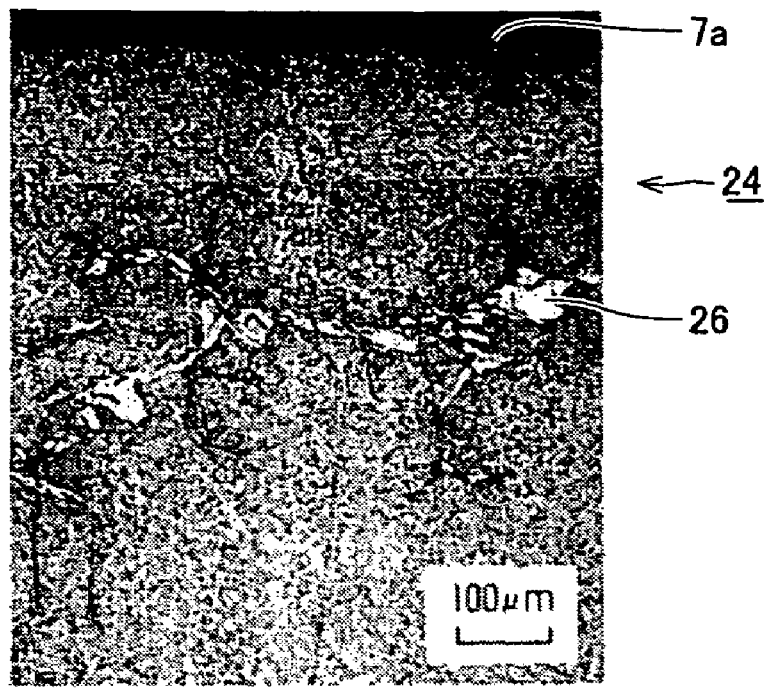
FIGS. 13A and 13B show hydrogen embrittlement or cracking in a photograph and a schematic representation, respectively.
Figure 13B:
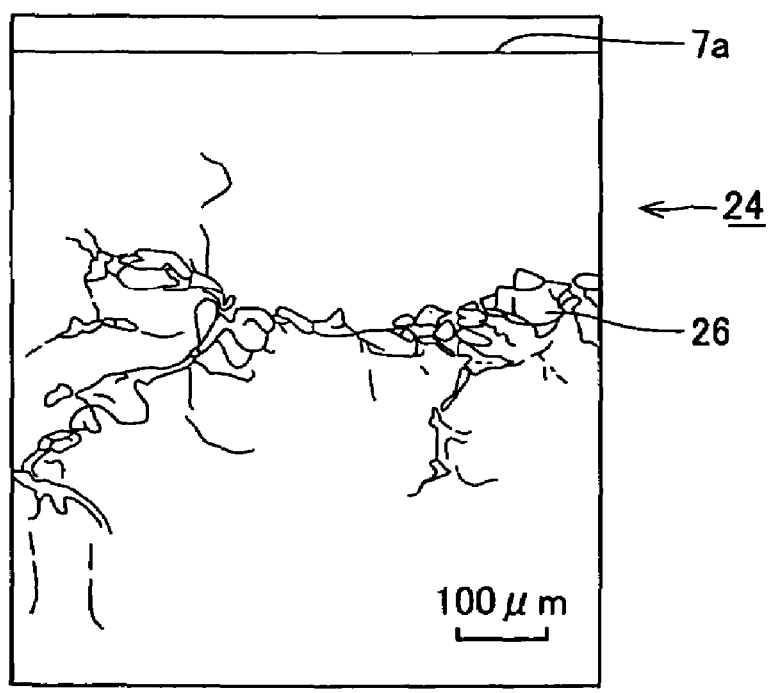

*[1]Indicated the longevity as there was only a single crack.
*[2]There was no flake observed that characterizes hydrogen embrittlement or cracking FIGS. 13A and 13B show a cross section including hydrogen embrittlement or cracking introduced in comparative example C1. FIGS. 13A and 13B show a fracture in a photograph and a schematic representation, respectively. It can be understood that under the above test conditions, hydrogen embrittlement or cracking is induced.

It can be understood from the Table 12 result that the examples of the present invention are longer in longevity than the comparative examples corresponding to conventional products. In particular, the present invention in example V2 is further longer in longevity than either comparative example C2, a blackened material, and comparative example C3, 13% Cr steel blackened, both enhanced in resistance to hydrogen embrittlement or cracking.

To examine why the present invention in example V2 provides a particularly long life, the present invention in examples V1 and V2 and comparative examples C1 and C2 corresponding to conventional products had their respective materials of steel measured at a surface layer to obtain their globular carbide area ratios and austenite grain numbers as defined by JIS. Table 13 shows a result thereof.

TABLE 13

Globular Carbide Area Ratio and Average Austenite Grain Size

| | Type of Steel | Process | Area ratio (%) | JIS defined grain size |
|---|---|---|---|---|
| Invention in Ex. V1 | JIS-SUJ2 | See FIG. 1 | 12.9 | 10.1 |
| Invention in Ex. V2 | JIS-SUJ2 | See FIG. 1 | 13.2 | 12.7 |
| Comparative Ex. C1 | JIS-SUJ2 | See FIG. 1 | 7.6 | 10 |
| Comparative Ex. C2 | JIS-SUJ2 | Normally quenched | 7.9 | 10.2 |

The present invention in example V1 contains globular carbide having a larger area ratio than comparative example C1 and a JIS defined grain size which does not have a significant difference than the comparative examples. The present invention in example V2 contains globular carbide having a larger area ratio than the comparative examples and a JIS defined grain size smaller than the comparative examples.

Comparative example C2 provides a longer life than comparative example C1, and the present invention in example V1 provides a further longer life than comparative example C2 and the present invention in example V2 provides a further longer life than the present invention in example V1. This reveals that hydrogen embrittlement or cracking can effectively be reduced by the following three factors:

(1) Presence of a nitrogen enriched layer;
(2) Globular carbide having an area ratio of no less than 10%; and
(3) Austenite grain having a JIS defined grain size number exceeding 10.

The present invention in example V2, satisfying all of the above three factors, achieves a significantly long life. Simply satisfying item (1) alone also effectively reduces hydrogen embrittlement or cracking, although it does not provide prolonged life effectively, and accordingly, satisfying at least items (1) and (2), as in the present invention in example V1, can provide a rolling bearing less prone to hydrogen embrittlement or cracking in an ambient of hydrogen.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bearing for an alternator, supporting a rotor shaft having one end with a pulley attached thereto and having a belt engaged therearound to transmit a driving force to said pulley to allow said rotor shaft to rotate a rotor, the bearing having a rolling element, an inner ring and an outer ring, at least one of said rolling element and said inner and outer rings having a nitrogen enriched layer and containing austenite crystal grains having a grain size number exceeding 10, wherein said at least one of said rolling element and said inner and outer rings having said nitrogen enriched layer has a surface layer containing globular carbide having an area ratio of no less than 10%, and said at least one of said rolling element and said inner and outer rings is formed of steel of SUJ2 as defined by JIS.

2. A bearing posed between a pulley having a belt engaged therearound and a rotative shaft passing through said pulley, the bearing comprising a rolling element, an inner ring and an outer ring, at least one of said rolling element and said inner and outer rings having a nitrogen enriched layer and containing austenite crystal grains having a grain size number exceeding 10, wherein said at least one of said rolling element and said inner and outer rings having said nitrogen enriched layer has a surface layer containing globular carbide having an area ratio of no less than 10%, and said at least one of said rolling element and said inner and outer rings is formed of steel of SUJ2 as defined by JIS.

* * * * *